United States Patent
Xie et al.

(10) Patent No.: US 9,449,222 B2
(45) Date of Patent: Sep. 20, 2016

(54) IMAGE PROCESSING DEVICE AND METHOD

(71) Applicant: FUJITSU LIMITED, Kawasaki (JP)

(72) Inventors: Shufu Xie, Beijing (CN); Yuan He, Beijing (CN); Jun Sun, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 41 days.

(21) Appl. No.: 14/674,882

(22) Filed: Mar. 31, 2015

(65) Prior Publication Data

US 2015/0310302 A1 Oct. 29, 2015

(30) Foreign Application Priority Data

Apr. 24, 2014 (CN) .......................... 2014 1 0169177

(51) Int. Cl.
*G06K 9/00* (2006.01)
*G06T 7/00* (2006.01)

(52) U.S. Cl.
CPC ......... *G06K 9/00375* (2013.01); *G06T 7/0081* (2013.01); *G06T 7/0083* (2013.01); *G06T 2207/10024* (2013.01); *G06T 2207/20144* (2013.01); *G06T 2207/20148* (2013.01)

(58) Field of Classification Search
None
See application file for complete search history.

(56) References Cited

U.S. PATENT DOCUMENTS

| | | | | |
|---|---|---|---|---|
| 6,721,447 B1* | 4/2004 | Kim | ...................... | G06K 9/4652 382/162 |
| 6,941,010 B2* | 9/2005 | Kim | ...................... | G06K 9/4652 382/162 |
| 7,227,987 B2* | 6/2007 | Kim | ...................... | G06K 9/4652 164/165 |
| 7,430,333 B2* | 9/2008 | Yu | .......................... | G06T 5/009 348/E9.042 |
| 7,542,600 B2* | 6/2009 | Yu | .......................... | G06T 5/009 382/164 |
| 8,416,987 B2* | 4/2013 | Tsuji | ................... | G06K 9/00228 382/103 |
| 9,349,062 B2* | 5/2016 | Mei | .......................... | G06K 9/18 |
| 2005/0152582 A1* | 7/2005 | Yoon | .................... | G06K 9/4652 382/115 |
| 2010/0322300 A1* | 12/2010 | Li | ...................... | G06K 9/00234 375/240.01 |
| 2012/0051625 A1* | 3/2012 | Appia | ................... | G06T 7/0059 382/154 |
| 2014/0180132 A1* | 6/2014 | Shan | .................... | A61B 5/0059 600/476 |
| 2015/0125074 A1* | 5/2015 | Yu | .......................... | G06T 7/408 382/164 |

OTHER PUBLICATIONS

Jang et al., "Robust object tracking using an adaptive color model," Proc. IEEE Int. Conf. Robotics and Automation, vol. 2, pp. 1677-1682, 2001.*
Hsieh et al., "Enhanced Face-Based Adaptive Skin Color Model", Journal of Applied Science and Engineering, vol. 15, No. 2, pp. 167-176, 2012.*
Xiong et al, Extraction of hand gestures with adaptive skin color models and its applications to meeting analysis, Proceedings of the Eighth IEEE International symposium on multimedia, pp. 647-651, Dec. 1, 2006.*

* cited by examiner

*Primary Examiner* — Feng Niu
(74) *Attorney, Agent, or Firm* — Staas & Halsey LLP

(57) ABSTRACT

The present disclosure relates to an image processing device and method. The device includes: an acquiring unit for acquiring an image containing an object image; a calculating unit for calculating one or more candidate object image areas based on color and edge characteristics of the image; a selecting unit for selecting a candidate object image area with the maximal similarity to a predetermined color model as a first object image area from the one or more candidate object image areas; a determining unit for determining other of the one or more candidate object image areas as a non-object image area or a second object image area with the first object image area; a creating unit for creating an adaptive color model; and a detecting unit for detecting, based on the adaptive color model, an area containing the object image in the each of the first and second object image areas.

19 Claims, 9 Drawing Sheets

IMAGE PROCESSING DEVICE AND METHOD

CROSS REFERENCE TO RELATED APPLICATIONS

This application claims the benefit of Chinese Application No. 201410169177.4, filed Apr. 24, 2014, the disclosure of which is incorporated herein by reference.

FIELD

The present disclosure relates to the field of image processing technology, and particularly to a device and a method for detecting a boundary of an object image, such as a finger image.

BACKGROUND

This section provides background information relating to the present disclosure, which is not necessarily prior art.

In scanning a document with an overhead scanner or shooting a document with a configured camera or smart phone, a user normally presses the document with a finger during the scanning process or the shooting process. Thus, a finger image of the user exists in a scanned/shoot image, resulting in unpleasantness of the scanned/shoot image of the document. Therefore, there is a need of removing the finger image from the image. In general, for removing the finger image, a finger area needs to be detected firstly, and then the finger area is removed.

The issue of automatic detection of a finger can be considered as an issue of image segmentation. In some skin-color segmentation methods, different color expressions (such as RGB, HSV or YCbCr) and classification methods (such as the Bayes classifier and the Gaussian mixture model) are applied to segment a skin-color area. However, a predefined skin-color model cannot express effectively the color variation in different conditions. By contrast, an adaptive skin-color model may better express the color variation in different illumination conditions, leading to a better segmentation. But if a background color is similar to a skin-color, it is difficult to segment a finger area from a background only with color information. In addition, if a pixel with a color similar to the skin-color exists in a background area, the pixel interferes with a representation of a constructed skin-color model.

SUMMARY

This section provides a general summary of the present disclosure, and is not a comprehensive disclosure of its full scope or all of its features.

An object of the present disclosure is to provide an image processing device and an image processing method that are capable of improving the precision of detection of the boundary of an object image, such as a finger image, so as to facilitate a removal of the object image from an image, and thus make the processed image to be more pleasant.

According to an aspect of the present disclosure, there is provided an image processing device including: an acquiring unit for acquiring an image containing an object image; a calculating unit for calculating one or more candidate object image areas based on color and edge characteristics of the image; a selecting unit for selecting, based a predetermined color model, a candidate object image area with the maximal similarity to the predetermined color model as a first object image area from the one or more candidate object image areas, wherein the maximal similarity is larger than or equal to a similarity threshold; a determining unit for determining, based on color characteristics of the one or more candidate object image areas, other of the one or more candidate object image areas as a non-object image area or a second object image area with the first object image area; a creating unit for creating, for each of the first and second object image areas, an adaptive color model; and a detecting unit for detecting, based on the adaptive color model, an area containing the object image in the each of the first and second object image areas.

According to another aspect of the present disclosure, there is provided an image processing method including: acquiring an image containing an object image; calculating one or more candidate object image areas based on color and edge characteristics of the image; selecting, based a predetermined color model, a candidate object image area with the maximal similarity to the predetermined color model as a first object image area from the one or more candidate object image areas, wherein the maximal similarity is larger than or equal to a similarity threshold; determining, based on color characteristics of the one or more candidate object image areas, other of the one or more candidate object image areas as a non-object image area or a second object image area with the first object image area; creating, for each of the first and second object image areas, an adaptive color model; and detecting, based on the adaptive color model, an area containing the object image in the each of the first and second object image areas.

According to another aspect of the present disclosure, there is provided a program product including machine-readable instruction codes stored thereon which, when read and executed by a computer, causes the computer perform the image processing method according to the present disclosure.

According to another aspect of the present disclosure, there is provided a machine-readable storage medium carrying the program product according to the present disclosure.

With the image processing device and the image processing method according to the present disclosure, color and edge characteristics are used to locate one or more candidate object image areas, such as candidate finger seed areas, and then a candidate finger seed area with a color most similar to a predefined finger color model is selected from the candidate finger seed areas. After that, the selected candidate finger seed area is used to verify the other candidate finger seed areas, so as to remove a part of invalid candidate finger seed areas. At last, an adaptive skin-color model is constructed for each of the remaining candidate finger seed areas to extract a respective finger area. Thereby, with the image processing device and the image processing method according to the present disclosure, the precision of detection of the boundary of an object image can be improved, facilitating a removal of the object image from an image, and thus making the processed image to be more pleasant.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1:
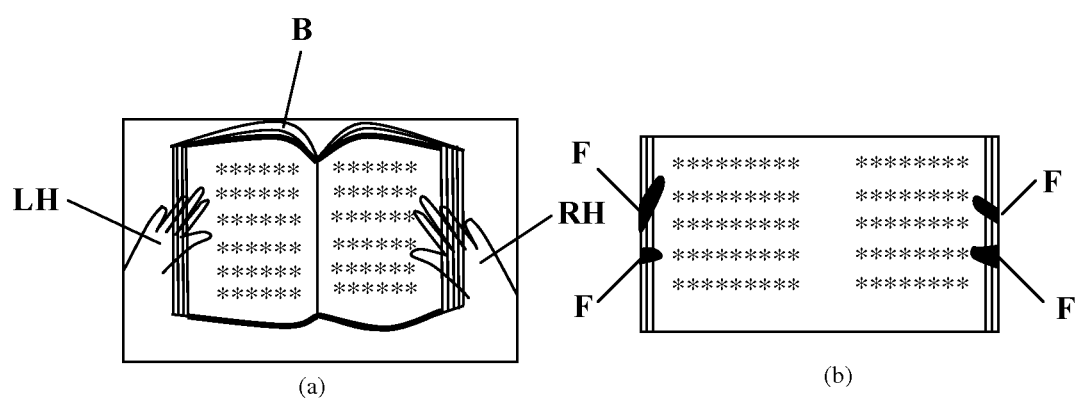
FIG. 1 is a schematic diagram of an exemplary image to which the technical solution of the present disclosure directs.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

FIG. 1 shows an exemplary image to which the technical solution of the present disclosure is directed. For example, when scanning a book B with an overhead scanner, a user presses two sides of the book with a finger of the left hand LH and the right hand RH during the scanning, thereby obtaining an image as shown in FIG. 1(a) on the left. The obtained image may be corrected with a known method in the art. For example, the image may be corrected by extracting an upper boundary and a lower boundary and then converting from a curved surface to a plan surface. FIG. 1(b) on the right shows an exemplary corrected image. Referring to FIG. 1(b), a finger image F appears on both side of the boundary of the book in the corrected image of the scanned book, resulting in unpleasantness of the corrected image. Therefore, the finger image F in the corrected image needs to be removed.

In general, for removing the finger image, a finger area needs to be detected firstly, and then the finger area is removed. With the technical solution of the present disclosure, the precision of detection of a finger area as shown in FIG. 1(b) can be improved, facilitating a removal of the object image from an image, and thus making the processed image to be more pleasant.

Figure 2:
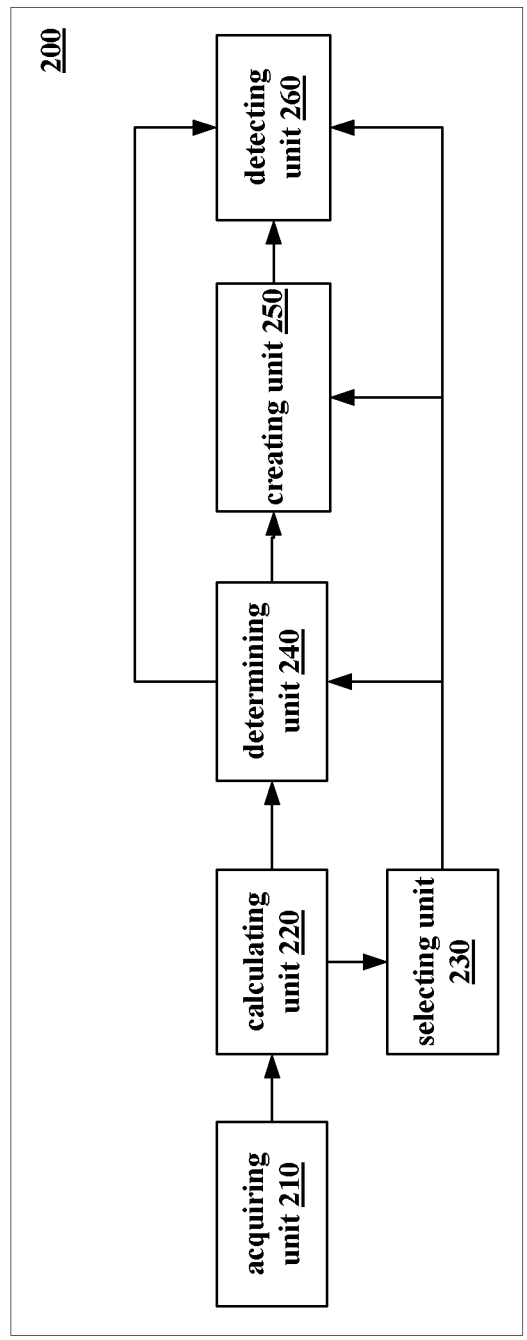
FIG. 2 is a block diagram of an image processing device according to an embodiment of the present disclosure.

As shown in FIG. 2, an image processing device 200 according to an embodiment of the present disclosure may include an acquiring unit 210, a calculating unit 220, a selecting unit 230, a determining unit 240, a creating unit 250 and a detecting unit 260.

Figure 3:
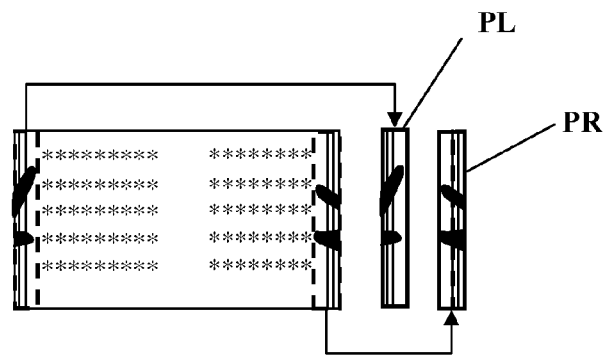
FIG. 3 is a schematic diagram of an exemplary application of an image processing device according to an embodiment of the present disclosure.

The acquiring unit 210 may acquire an image containing an object image. Only an area close to a side of the document needs to be considered since a finger always enters the image from the side of the document. For example, a part of image blocks close to a side (the left side or the right side) of the document may be cut from the input image, as shown in FIG. 3. The image blocks that are respectively cut from the left side and the right side are denoted as PL and PR. A procedure of locating a finger seed area will be described below by taking the left image block PL as an example.

The calculating unit 210 may calculate one or more candidate object (finger) image areas based on color and edge characteristics of the image acquired by the acquiring unit 210. The candidate finger image areas may also be referred to as candidate finger seed areas, from which a final candidate finger seed area may be obtained.

The selecting unit 230 may select, based a predetermined color model, a candidate object image area with the maximal similarity to the predetermined color model as a first object image area from the one or more candidate object image areas calculated by the calculating unit 220. The predetermined color model is obtained from a calculation on labeled finger data. It is indicated that the characteristics of a candidate object image area is most similar to the characteristics of the labeled finger data if the candidate object image area has the maximal similarity to the predetermined color model. Thus, the candidate object image area can act as a reference or standard for a later comparison. Here, the maximal similarity to the predetermined color model should be larger than or equal to a similarity threshold. In other word, if the maximal similarity is less than the similarity threshold, all of the candidate object image areas are cancelled, which means no object image area is found in the image acquired by the acquiring unit 210.

Next, the determining unit 240 may determine, based on color characteristics of the one or more candidate object image areas calculated by the calculating unit 220, other of the one or more candidate object image areas as a non-object image area or a second object image area with the first object image area selected by the selecting unit 230. The first object image area and the second object image area are the obtained finger seed areas.

Then, the creating unit 250 may create, for each of the first object image area selected by the selecting unit 230 and the second object image areas determined by the determining unit 240, an adaptive color model.

At last, the detecting unit 260 may detect, based on the adaptive color model created by the creating unit 250, an area containing the object image in the each of the first object image area selected by the selecting unit 230 and the second object image areas determined by the determining unit 240.

With the image processing device 200 according to the embodiment of the present disclosure, an area-based adaptive skin-color model is constructed. Firstly, color and edge characteristics are used to detect candidate finger seed areas. Then, a candidate finger seed area with a color similar to a predefined finger color model is selected from the candidate finger seed areas. After that, the selected candidate finger seed area is used to verify the other candidate finger seed areas, so as to remove invalid candidate finger seed areas. At last, an adaptive skin-color model is constructed for each of the remaining candidate finger seed areas to extract a respective finger area. Thereby, the precision of detection of the boundary of the finger area can be improved, facilitating a removal of the finger image from an image, and thus making the processed image to be more pleasant.

For a better understanding of the technical solution of the present disclosure, various components of the image processing device 200 shown in FIG. 2 will be described below in detail.

Figure 4:
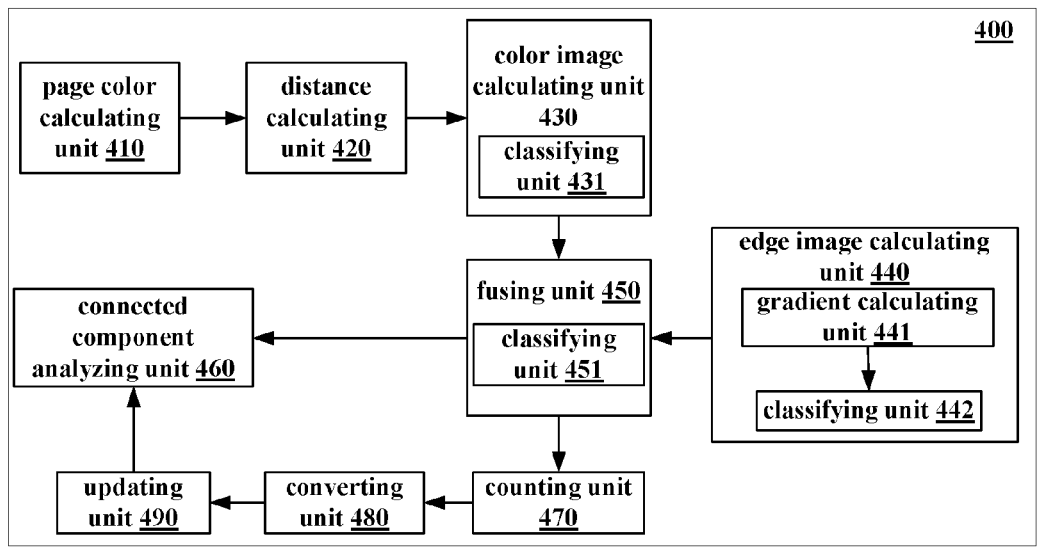
FIG. 4 is a block diagram of a calculating unit in an image processing device according to an embodiment of the present disclosure.

FIG. 4 is a block diagram of a calculating unit 400 in an image processing device according to an embodiment of the present disclosure. The calculating unit 400 shown in FIG. 4 corresponds to the calculating unit 220 shown in FIG. 2.

The calculating unit 400 may include a page color calculating unit 410, a distance calculating unit 420, a color image calculating unit 430, an edge image calculating unit 440, a fusing unit 450, a connected component analyzing unit 460, and the like.

Figure 5:
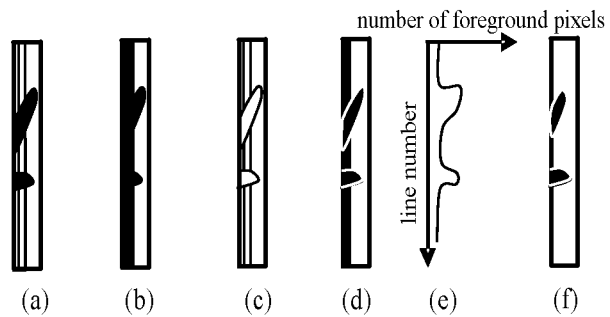
FIG. 5 is a schematic diagram of an exemplary application of an image processing device according to an embodiment of the present disclosure.

The page color calculating unit 410 may calculate a page color based on the color of each pixel in the image (such as the image shown in FIG. 5(*a*)) acquired by the acquired unit 210 (as shown in FIG. 1).

In particular, for the detection of a finger on a document, a basic assumption is that the finger has a different color from a page. In the technical solution of the present disclosure, the page color (i.e., the background color) may be estimated firstly, and then an area with a different color from the page may be remained. A color space of YUV may be adopted in the technical solution, and only U-component and V-component are used without Y-component. This is because Y-component represents an illumination intensity, which is often effected by the variation of the illumination. A U-value and a V-value of each pixel of the cut image block PL are quantified into individual bins, and a corresponding two-dimensional histogram is calculated. A bin with the maximal value in the histogram is selected to calculate an average color of pixels within the bin as the page color, which is denoted as ($U_{page}$, $V_{page}$).

After the page color is obtained, the distance calculating unit 420 may calculate a distance between the color of each pixel in the image and the page color to obtain a distance map. Specifically, the distance calculating unit 420 may obtain a color distance map D from the following formula (1):

$$D(i,j) = |U_{i,j} - U_{page}| + |V_{i,j} - V_{page}| \quad (1)$$

Here, $U_{i,j}$ and $V_{i,j}$ denote the U-component and V-component of a pixel (i, j), respectively.

The color image calculating unit 430 may calculate a color binary image based on the distance map obtained by the distance calculating unit 420.

Preferably, the color image calculating unit 430 may include a classifying unit 431, as shown in FIG. 4. The classifying unit 431 may classify, based on the distance map obtained by the distance calculating unit 420, a pixel with a distance between the color value and the average color value larger than or equal to a first distance threshold as an object pixel, and a pixel with a distance between the color value and the average color value smaller than the first distance threshold as a background pixel, so as to obtain a color binary image.

Specifically, the color image calculating unit 430 may perform a global thresholding method (such as the Otsu's method) on the distance map D obtained by the distance calculating unit 420 to obtain a color binary image $B_{color}$ (as shown in FIG. 5(*b*)) according to the following formula (2):

$$B_{color}(i,j) = \begin{cases} 1, & d(i,j) \geq T_1 \\ 0, & d(i,j) < T_1 \end{cases} \quad (2)$$

Where $T_1$ denotes a global threshold (the first distance threshold), "1" denotes a foreground pixel value, and "0" denotes a background pixel value.

Furthermore, the edge image calculating unit 440 may calculate an edge binary image based on the image acquired by the acquiring unit 210 (as shown in FIG. 1).

Preferably, the edge image calculating unit 440 may include a gradient calculating unit 441 and a classifying unit 442, as shown in FIG. 4.

The gradient calculating unit 441 may apply, based on the distance map D obtained by the distance calculating unit 420 or color information or intensity information of the image acquired by the acquiring unit 210, a gradient operator to the image to obtain a gradient image. A method for calculating a gradient image is well known in the art, which thus will not be described in detail herein.

The classifying unit 442 may classify, in the gradient image obtained by the gradient calculating unit 441, a pixel with a gradient larger than or equal to a gradient threshold as an edge pixel, and a pixel with a gradient smaller than the gradient threshold as a non-edge pixel, so as to obtain the edge binary image $B_{edge}$ (as shown in FIG. 5(*c*)).

Further, the fusing unit 450 may fuse the color binary image $B_{color}$ and the edge binary image $B_{edge}$ to obtain a binary fused image $B_{fusion}$ (as shown in FIG. 5(*d*)).

Preferably, the fusing unit 450 may include a classifying unit 451, as shown in FIG. 4. The classifying unit 451 may classify a pixel that is both a foreground pixel and a non-edge pixel as an object pixel, and a pixel that is either a background pixel or an edge pixel as a non-object pixel.

Specifically, the fusing unit 450 may fuse the color binary image $B_{color}$ and the edge binary image $B_{edge}$ to obtain a binary fused image $B_{fusion}$ according to the following formula (3):

$$B_{fusion}(i, j) = \begin{cases} 1, & B_{color}(i, j) = 1 \text{ and } B_{edge}(i, j) = 0 \\ 0, & B_{color}(i, j) = 0 \text{ or } B_{edge}(i, j) = 1 \end{cases} \quad (3)$$

Here, with the edge information of the image, a foreground pixel ("1") with stronger edge intensity in the binary image $B_{color}$ is set to be a background pixel ("0"). This process is to ensure that a finger seed area can be separated from content on the page by using the edge information even if the finger touches the content on the page.

Further, the connected component analyzing unit 460 may perform a connected component analysis (CCA) algorithm on the binary fused image obtained by the fusing unit 450, so as to obtain one or more connected components in the binary fused image as the one or more candidate object image areas. The CCA algorithm is well known is the art, which thus will not be described in detail herein.

In the binary image $B_{fusion}$, the connected component analyzing unit 460 may combine the foreground pixels into an area by means of a connected component labeling method. Furthermore, a connected component farther away from a side (such as, the left side of PL) of the image block is removed since a finger always enters from the side (such as, the left side of PL) of the image block, and thus a processed binary image $B_{fusion}^{rev}$ is obtained.

In other words, according to a preferred embodiment of the present disclosure, the determining unit 240 may convert all pixels in a connected component with a distance to a predetermined edge of the image larger than a predetermined distance among the one or more connected components into non-object pixels, so that the connected component is no longer a candidate object image area.

Furthermore, the calculating unit 400 may further include a counting unit 470, a converting unit 480 and an updating unit 490, as shown in FIG. 4.

The counting unit 470 may count, for each row in the binary fused image obtained by the fusing unit 450, a sum of pixels which are object pixels (as shown in FIG. 5(e)).

Then, the converting unit 480 may convert all object pixels on a row for which the sum counted by the counting unit 470 is smaller than a sum threshold into non-object pixels.

Furthermore, the updating unit 490 may update labeling information of each connected component.

Specifically, the counting unit 470 may count, for each row in the image block $B_{fusion}^{rev}$, a sum of pixels which are foreground pixels $\{num_1, num_2, \ldots, num_h\}$ (h denotes the height of the image block). The threshold may be predetermined. Then, all the lines with $num_i$ smaller than the predetermined threshold are selected, and the converting unit 480 may set all the foreground pixels ("1") of the selected lines to be background pixels ("0"). Thus, a new binary image $B_{fusion}^{rev*}$ is obtained. For the new binary image $B_{fusion}^{rev*}$, the updating unit 490 may update labeling information of each connected component by using the connected component labeling method again.

Preferably, the determining unit 240 may convert all pixels in a connected component with an area smaller than a lower limit area threshold or larger than an upper limit area threshold among the one or more connected components into non-object pixels, so that the connected component is no longer a candidate object image area. In this way, the connected component that is obviously not the object (finger) image can be removed, reducing the burden of the subsequent process.

Now, the remaining connected components may be considered as the candidate finger seed areas (as shown in FIG. 5(f)). It is assumed that there are K candidate finger seed areas, denoted as $R_1, R_2, \ldots, R_K$, respectively.

Figure 6:
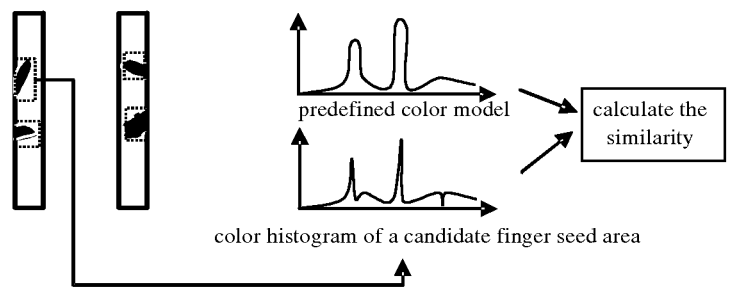
FIG. 6 is a schematic diagram of an exemplary application of an image processing device according to an embodiment of the present disclosure.

Next, the function of the selecting unit 230 in the image processing device 200 according to an embodiment of the present disclosure is described in combination with FIG. 6. As described above, the selecting unit 230 may select, based a predetermined color model, a candidate object image area with a maximal similarity to the predetermined color model as a first object image area from the one or more candidate object image areas (for example, the K candidate finger seed areas) calculated by the calculating unit 220.

It is reasonable to assume that multiple fingers on the image of the document belong to one person. Thus, these fingers have similar color distributions. Due to different light intensities and imaging conditions, a color distribution model obtained from labeled data can not describe the color distribution of a current input image very well. Here, a finger color distribution (the predetermined color model) maybe obtained from labeled finger data firstly. Specifically, it is possible to employ the color space of YUV without the Y-component as above. With these labeled finger data, a normalized color distribution histogram may be calculated for each finger area $R_{label,i}$(i=1, 2, . . . , M) from the following formula (4):

$$H_i = \{h_{i,1}, h_{i,2}, \ldots, h_{i,d}\} \quad (4)$$

Where d denotes the dimension of the color histogram. Then, a color distribution model of the labeled data $H_{model}$ ($\{h_{model,1}, h_{model,2}, \ldots, h_{model,d}\}$) can be obtained by calculating the average value of the color histograms of the M areas from the following formula (5):

$$h_{model,j} = \frac{1}{M} \sum_{i=1}^{M} h_{i,j} \quad (5)$$

A normalized histogram Hi may be obtained for each candidate finger seed area $R_{seed,i}$(i=1, 2, . . . , K), and the similarity of the normalized histogram Hi to the color distribution model of the labeled data can be calculated from the following formula (6):

$$Sim(H_i, H_{model}) = Sum_{j=1, \ldots, d}(\min(h_i, h_{model,i})) \quad (6)$$

The selecting unit 230 may select the maximal similarity $Sim_{max}$ from $Sim_i$(i=1, 2, . . . , K). If $Sim_{max}$ is smaller than a preset threshold, all of the finger seed areas are denied, which means no finger is detected in the input image; otherwise, the area $R_{max}$ corresponding to the similarity $Sim_{max}$ can act as the first object image area to be used to verify the validation of other seed areas and detect other potential candidate seed area.

Next, the determining unit 700 in the image processing device according to an embodiment of the present disclosure is described with reference to FIG. 7. The determining unit 700 shown in FIG. 7 corresponds to the determining unit 240 shown in FIG. 2.

Figure 7:
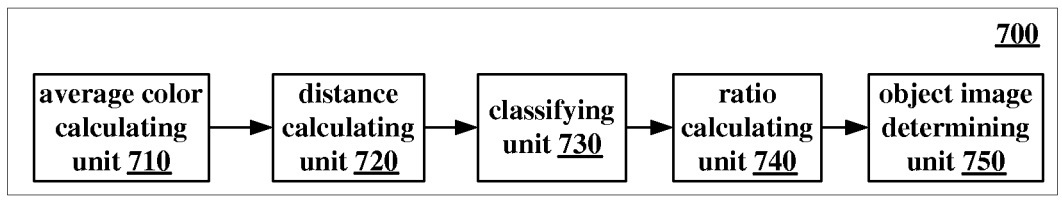
FIG. 7 is a block diagram of a determining unit in an image processing device according to an embodiment of the present disclosure.

As shown in FIG. 7, the determining unit 700 may include an average color calculating unit 710, a distance calculating unit 720, a classifying unit 730, a ratio calculating unit 740 and an object image determining unit 750.

The average color calculating unit 710 may calculate an average color value of pixels in the first object image area obtained by the selecting unit 230.

Next, the distance calculating unit 720 may calculate, in one of the other candidate object image areas, a distance between a color value of each pixel and the average color value calculated by the average color calculating unit 710.

Next, the classifying unit 730 may classify a pixel with a distance between the color value and the average color value, which is calculated by the distance calculating unit 720, smaller than or equal to a distance threshold as an object pixel, and a pixel with a distance between the color value and the average color value larger than the distance threshold as a non-object pixel.

Furthermore, the ratio calculating unit 740 may calculate a ratio of the number of object pixels classified by the classifying unit 730 to the number of pixels in the one of the other candidate object image areas.

After that, the object image determining unit 750 may determine the one of the other candidate object image areas with the ratio, which is calculated by the ratio calculating unit 740, larger than or equal to a ratio threshold as a second object image area, and the one of the other candidate object image areas with the ratio smaller than the ratio threshold as a non-object image area.

Specifically, the validation of the other area may be verified with area $R_{max}$ as follows. The following values may be calculated: a color average $color_{avg}$ of the pixels in the area $R_{max}$, and a distance between a pixel in the area $R_{max}$ and the color average $color_{avg}$. These distances are ranked in an ascending order, and a threshold $T_2$ is set based on a preset percentage (for example, if the preset percentage is 95% and the number of pixel in the area $R_{max}$ is $Num_{max}$, then a distance whose location in the ranked queue of the distances is most close to (95%*$Num_{max}$) is selected as the threshold). For the pixels in the other seed area Ri (i=1, 2, . . . , K, and i!=max), each of the pixel may be classified as a finger pixel or a non-finger pixel according to the following formula (7):

$$\text{Label}(j) = \begin{cases} \text{finger.pixel}, & d(j, color_{avg}) \leq T_2 \\ \text{nonfingerpixel}, & d(j, color_{avg}) > T_2 \end{cases} \quad (7)$$

Where, $d(j, color_{avg})$ denotes a distance between the color of a $j^{th}$ pixel in the region $R_i$ and the color average $color_{avg}$. the ratio of finger pixel in the region $Ratio_i$ may be calculated from the following formula (8):

$$Ratio_i = \frac{\#\{fingerpixel\}}{\#\{totalpixel\}} \quad (8)$$

If the ratio $Ratio_i$ is smaller than a preset threshold $T_3$, the area $R_i$ is considered to be invalid and is removed; otherwise, the area $R_i$ is considered to be valid and is kept.

Alternatively, the validation of the area $R_i$ can be verified based on the similarity of the color histogram of the area $R_i$ to that of the $R_{max}$. Specifically, the similarity of a normalized color histogram of the area $R_i$ to the color histogram of the area $R_{max}$ can be calculated from formula (6). If the similarity is smaller than a preset threshold, the area $R_i$ is considered to be invalid and is removed; otherwise, the area $R_i$ is considered to be valid. Clearly, the two strategies may be combined to verify the validation of an area.

Next, an image processing device 800 according to another embodiment of the present disclosure is described with reference to FIG. 8. The image processing device 800 in FIG. 8 is similar to the image processing device 200 in FIG. 2 except for the part illustrated by a dotted line, thus the similar part will not be described herein.

Figure 8:
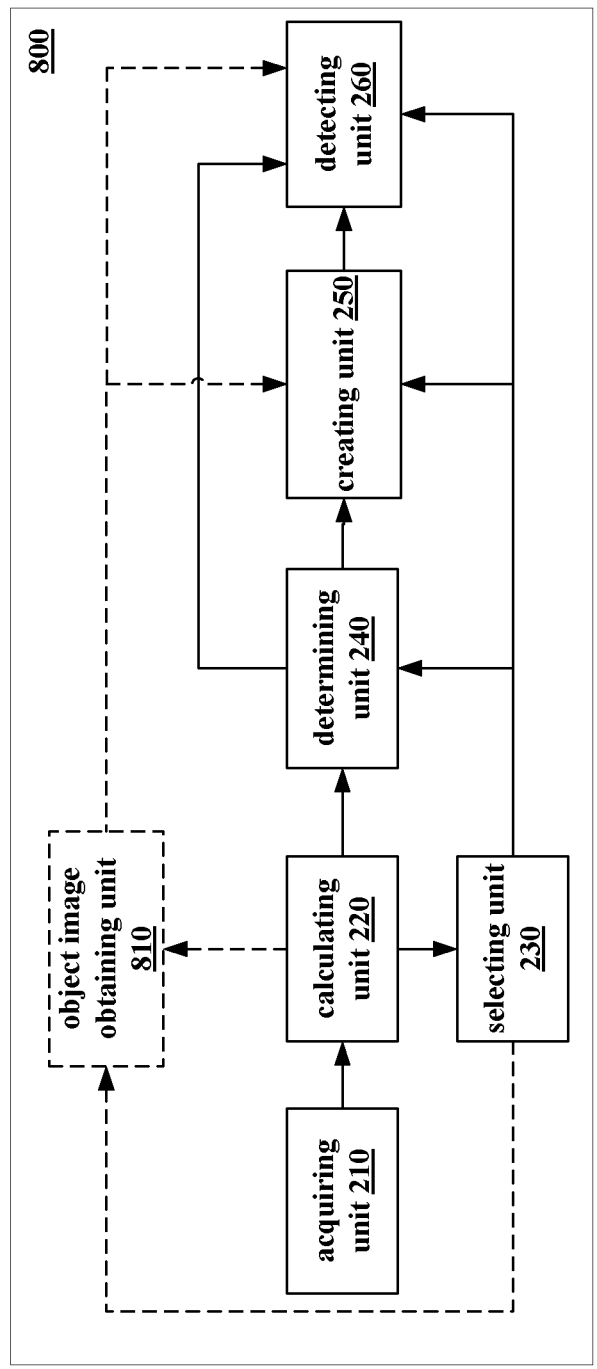
FIG. 8 is a block diagram of an image processing device according to another embodiment of the present disclosure.

Referring to FIG. 8, the image processing device 800 may further include an object image obtaining unit 810.

The object image obtaining unit 810 may obtain, based on color characteristics of other area of the image acquired by the acquiring unit 210 except for the one or more candidate object image areas calculated by the calculating unit 220, a third object image area from the other area with the first object image area selected by the selecting unit 230.

Further, the creating unit 250 may create a further adaptive color model for the third object image area.

Furthermore, the detecting unit 260 may detect an area containing the object image in the third object image area based on the further adaptive color model created by the creating unit 250.

As described above, the image processing device 800 as shown in FIG. 8 may further obtain the third object image area from the area other than the candidate object image areas, further reducing the miss rate, and improving the accuracy of the detection of the object image areas.

Next, an object image obtaining unit 900 in an image processing device according to an embodiment of the present disclosure is described with reference to FIG. 9. The object image obtaining unit 900 shown in FIG. 9 corresponds to the object image obtaining unit 810 shown in FIG. 8.

Figure 9:
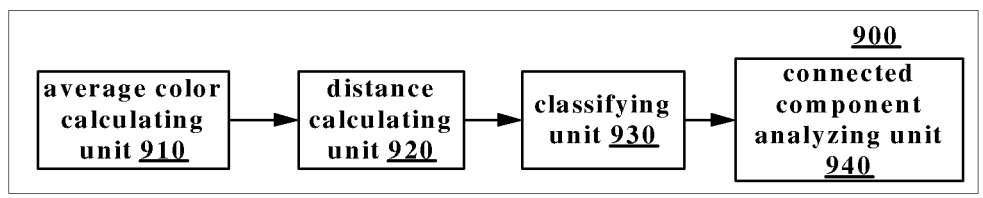
FIG. 9 is a block diagram of an object image obtaining unit in an image processing device according to an embodiment of the present disclosure.

As shown in FIG. 9, the object image obtaining unit 900 may include an average color calculating unit 910, a distance calculating unit 920, a classifying unit 930 and a connected component analyzing unit 940.

The average color calculating unit 910 may calculate an average color value of pixels in the first object image area selected by the selecting unit 230.

Next, the distance calculating unit 920 may calculate, in the other area of the image acquired by the acquiring unit 210 except for the one or more candidate object image areas calculated by the calculating unit 220, a distance between a color value of each pixel and the average color value calculated by the average color calculating unit 910.

Next, the classifying unit 930 may classify a pixel with a distance between the color value and the average color value, which is calculated by the distance calculating unit 920, smaller than or equal to a distance threshold as an object pixel, and a pixel with a distance between the color value and the average color value larger than the distance threshold as a non-object pixel, so as to obtain an other area binary image.

Next, the connected component analyzing unit 940 may perform the CCA algorithm on the other area binary image, so as to obtain a connected component in the other area binary image as the third object image area.

Figure 10:
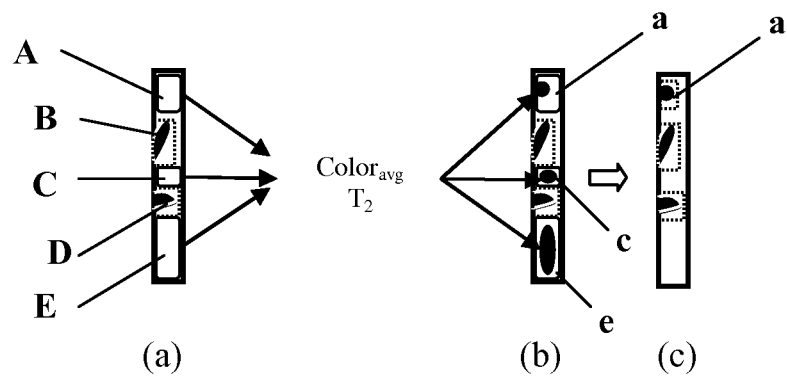
FIG. 10 is a schematic diagram of an exemplary application of an image processing device according to an embodiment of the present disclosure.

Specifically, based on the color average $color_{avg}$ of the selected area $R_{max}$, a pixel in the area of the cut image block PL except for the seed areas (Ri, i=1, 2, . . . , K) can be classified as a foreground pixel or a background pixel according to the following formula (9):

$$\text{Label}(i) = \begin{cases} 1, & d(i, color_{avg}) \leq T_2 \\ 0, & d(i, color_{avg}) > T_2 \end{cases} \quad (9)$$

where $d(i, color_{avg})$ denotes a distance between the color of pixel i and the average color $color_{avg}$ of the area $R_{max}$. From the new obtained binary image, a candidate connected component is obtained by the connected component labeling method, and those connected components with an improper size or a farther distance to a side of the boundary of the image are removed, as shown in FIG. 10. In FIG. 10(a) on the left, areas B and D represent candidate object image areas, and areas A, C and E represent the other areas except for the candidate object image areas. By the process of the object image obtaining unit 810 (or 900), further candidate connected components a, c and e can be obtained, as shown in FIG. 10(b) in the middle. At last, an ultimate connected component a can be obtained as the third object image area after those connected components with an improper size and a farther distance to a side of the boundary of the image are removed, as shown in FIG. 10(c) on the right. The connected component obtained here may act as finger seed areas for the finger extraction, together with the remaining areas above.

Figure 11:
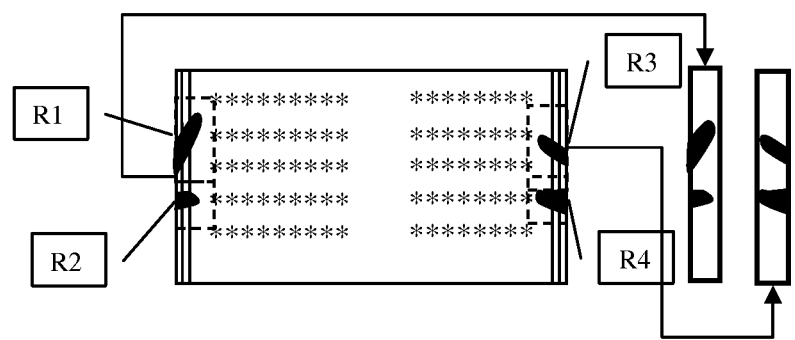
FIG. 11 is a schematic diagram of an exemplary application of an image processing device according to an embodiment of the present disclosure.

Image blocks corresponding to the above detected finger seed areas may be cut from the input image, as shown in FIG. 11. For each of the cut image blocks, a multi-Gaussian skin-color model may be constructed based on pixels in the finger seed areas, and an edge image may be calculated for the image block. Then, the pixels may be classified based on the skin-color model and the edge image. At last, a post process (such as a noise removing, a connected component labeling and a dilation operation) may be employed to extract a finger area. There exists a conventional technology in the art for extracting a finger area from the finger seed areas, which thus will not be described in detail herein.

The disclosure is described above with an example of finger image. According to the embodiments, there are two stages where an adaptive color model is used, a first stage is for locating the candidate finger area, and a second stage is for extracting a finger area. Specifically, in the first stage, an adaptive color model is firstly selected, and then is used to remove invalid candidate areas and locate another potential finger area. Thus, the precision of detection of the boundary of a finger area can be improved, facilitating a removal of the finger image from an image, and thus making the processed image to be more pleasant.

Figure 12:
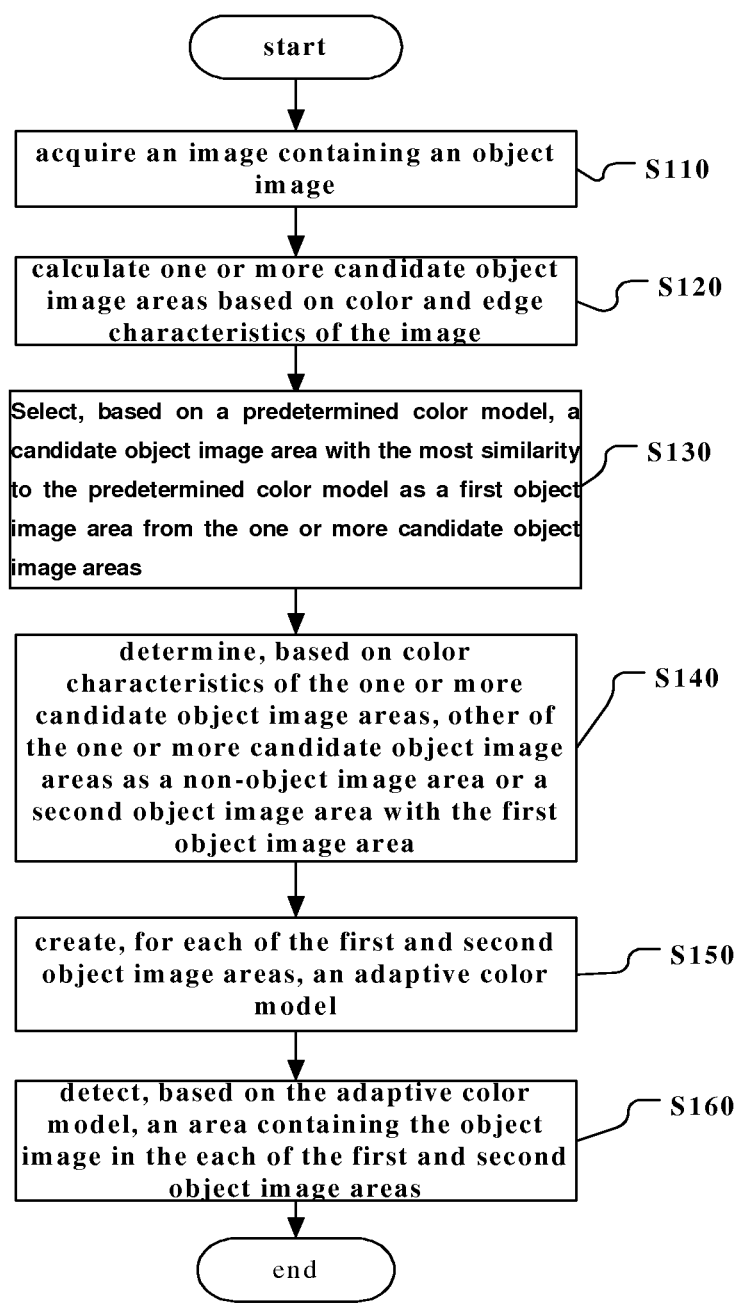
FIG. 12 is a flowchart of an image processing method according to an embodiment of the present disclosure.

Next, an image processing method according to an embodiment of the present disclosure is described with reference to FIG. 12. Referring to FIG. 12, the image processing method starts from step S110, where an image containing an object image is acquired.

Next, in step S120, one or more candidate object image areas are calculated based on color and edge characteristics of the image.

Next, in step S130, a candidate object image area with the maximal similarity to the predetermined color model is selected, based a predetermined color model, as a first object image area from the one or more candidate object image areas, wherein the maximal similarity is larger than or equal to a similarity threshold.

Next, in step S140, another of the one or more candidate object image areas are determined, based on color characteristics of the one or more candidate object image areas, as a non-object image area or a second object image area with the first object image area.

Next, in step S150, an adaptive color model is created for each of the first and second object image areas.

At last, in step S160, an area containing the object image is detected, based on the adaptive color model, in the each of the first and second object image areas.

According to an embodiment of the present disclosure, in the step S120 of calculating the one or more candidate object image areas, a page color may be calculated based on the color of each pixel in the image. Then, a distance between the color of each pixel in the image and the page color may be calculated to obtain a distance map. Further, a color binary image may be calculated based on the distance map and an edge binary image may be calculated based on the image. After that, the color binary image and the edge binary image may be fused to obtain a binary fused image. At last, a connected component analysis algorithm (CCA) may be performed on the binary fused image, so as to obtain one or more connected components in the binary fused image as the one or more candidate object image areas.

According to an embodiment of the present disclosure, in fusing the color binary image and the edge binary image to obtain the binary fused image, a pixel that is both a foreground pixel and a non-edge pixel may be classified as an object pixel, and a pixel that is either a background pixel or an edge pixel may be classified as a non-object pixel.

According to an embodiment of the present disclosure, in calculating the color binary image based on the distance map, a pixel with a distance between the color value and the average color value larger than or equal to a distance threshold may be classified as a foreground pixel, and a pixel with a distance between the color value and the average color value small than the distance threshold may be classified as a non-object pixel, so as to obtain the color binary image.

According to an embodiment of the present disclosure, in calculating the edge binary image based on the image, a gradient operator may be applied to the image based on the distance map or color information or intensity information of the image to obtain a gradient image. Then, in the gradient image, a pixel with a gradient larger than or equal to a gradient threshold may be classified as an edge pixel, and a pixel with a gradient smaller than the gradient threshold may be classified as a non-edge pixel, so as to obtain the edge binary image.

According to an embodiment of the present disclosure, all pixels in a connected component with a distance to a predetermined edge of the image larger than a predetermined distance among the one or more connected components may be converted into non-object pixels, so that the connected component is no longer a candidate object image area.

According to an embodiment of the present disclosure, in calculating the one or more candidate object image areas based on the color and edge characteristics of the image, a sum of pixels which are object pixels may be counted for each row in the binary fused image. Then, all object pixels on a row for which the sum is smaller than a sum threshold may be converted into non-object pixels. After that, labeling information of each connected component may be updated.

According to an embodiment of the present disclosure, all pixels in a connected component with an area smaller than a lower limit area threshold or larger than an upper limit area threshold among the one or more connected components may be converted into non-object pixels, so that the connected component is no longer a candidate object image area.

According to an embodiment of the present disclosure, in the step S140 of determining the other of the one or more candidate object image areas as the non-object image area or the second object image area with the first object image area, an average color value of pixels in the first object image area may be calculated. Then, in one of the other candidate object image areas, a distance between a color value of each pixel and the average color value may be calculated. After that, a pixel with a distance between the color value and the average color value smaller than or equal to a distance threshold may be classified as an object pixel, and a pixel with a distance between the color value and the average color value larger than the distance threshold may be classified as a non-object pixel. Further, a ratio of the number of object pixels to the number of pixels in the one of the other candidate object image areas may be calculated. Then, the one of the other candidate object image areas with the ratio larger than or equal to a ratio threshold may be determined as a second object image area, and the one of the other candidate object image areas with the ratio smaller than the ratio threshold may be determined as a non-object image area.

According to an embodiment of the present disclosure, a third object image area may be obtained from the other area with the first object image area based on color characteristics of other area of the image except for the one or more candidate object image areas. Then, a further adaptive color model may be created for the third object image area. After that, an area containing the object image may be detected in the third object image area based on the further adaptive color model.

According to an embodiment of the present disclosure, in obtaining the third object image area from the other area with the first object image area, an average color value of pixels in the first object image area may be calculated. Then, in the other area of the image except for the one or more candidate object image areas, a distance between a color value of each pixel and the average color value may be calculated. Further, a pixel with a distance between the color value and the average color value smaller than or equal to a distance threshold may be classified as an object pixel, and a pixel with a distance between the color value and the average color value larger than the distance threshold may be classified as a non-object pixel, so as to obtain an other area binary image. After that, connected component analysis algorithm may be performed on the other area binary image, so as to obtain a connected component in the other area binary image as the third object image area.

Various specific implementations of the above steps of the image processing method according to the embodiments of the present disclosure are described in detail previously, thus will not repeated herein.

Obviously, various processes of the image processing method according to the embodiments of the present disclosure may be implemented in a form of computer-executable program stored in various machine-readable storage mediums.

Furthermore, the object of the present disclosure may be implemented by a way of providing directly or indirectly a storage medium storing the above executable program code to a system or equipment, a computer or a central processing unit (CPU) of which reads and executes the program code. Here, the embodiments of the present disclosures are not limited to the program, as long as the system or equipment is capable of executing the program. The program may be in any forms, such as a target program, a program executed by an interpreter, or a script program provided to an operation system.

The above machine-readable storage mediums includes, but not limited to, various memories or storage units, a semiconductor device, a disk unit, such as an optical disk, a magnetic disk or a magneto-optical disk, and other mediums suitable for information storage.

In addition, the technical solution of the present disclosure may also be implemented by downloading and installing the computer program according to the present disclosure to a computer via a connection between the computer and a corresponding website on Internet, and executing the computer program by the computer.

Figure 13:
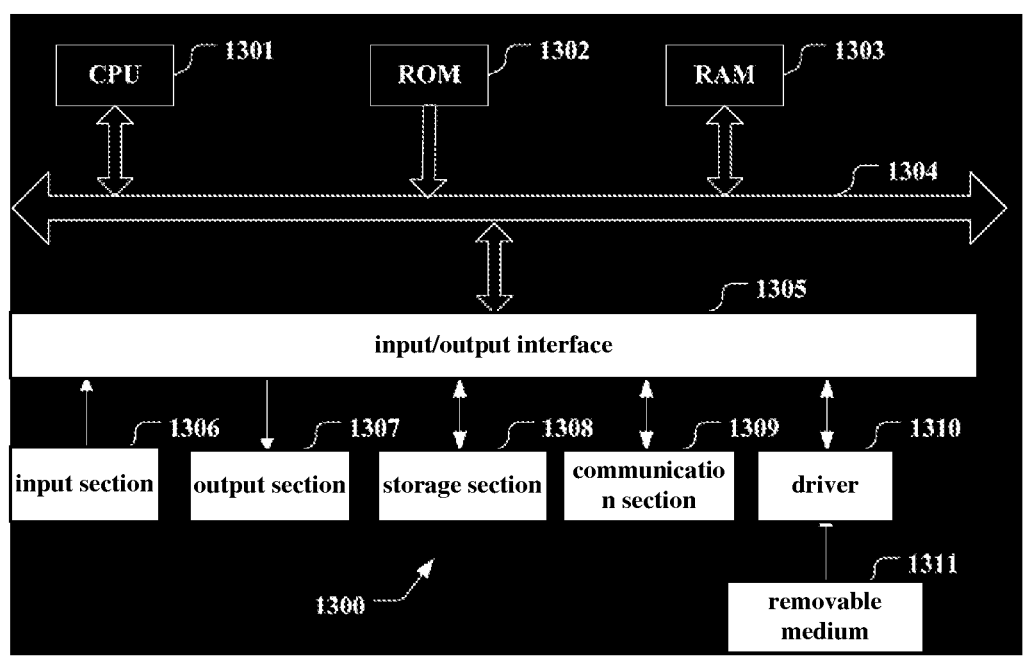
FIG. 13 is a block diagram showing an exemplary structure of a general-purpose personal computer capable of implementing the image processing device and the image processing method according to the embodiments of the present disclosure.

FIG. 13 is a block diagram showing an exemplary structure of a general-purpose personal computer capable of implementing the image processing device and the image processing method according to the embodiments of the present disclosure.

Referring to FIG. 13, a CPU 1301 performs various types of processing according to the program stored in a Read Only Memory (ROM) 1302 or the program loaded to a Random Access Memory (RAM) 1303 from the storage section 1308. In the RAM 1303, the data needed when the CPU 1301 performing various types of processing is stored as required. The CPU 1301, the ROM 1302 and the RAM 1303 are connected to each other via a bus 1304. An input/output interface 1305 is also connected to the bus 1304.

The following components are also connected to the input/output interface 1305: an input section 1306 (including a keyboard, a mouse and the like), an output section 1307 (including a display, such as a Cathode Ray Tube (CRT), a Liquid Crystal Display (LCD), and a loudspeaker), a storage section 1308 (including a hard disc and the like), a communication section 1309 (including an internet interface, such as a LAN card, a modem etc). The communication section 1309 performs communication processing over a network such as the Internet. A driver 1310 can also be connected to the input/output interface 1305 as required. A removable medium 1311 such as a magnetic disk, an optical disk, a magneto-optical disk, a semiconductor memory can be installed on the driver 1310 as required, such that the computer program read from the removable medium 1311 can be installed in the storage part 1308 as required.

In the case of performing the above series of processes by the software, the program constituting the software can be installed from the network such as the Internet or from the storage medium such as the removable medium 1311.

Those skilled in the art should understand that, this storage medium does not limit to the removable medium 1311 shown in FIG. 13, which stores the program and is distributed separately with the device to provide the program to a user. Examples of the removable medium 1311 include a magnetic disk (including a floppy disk (a registered trademark), an optical disk (including a Compact Disk Read Only Memory (CD-ROM) and a Digital Versatile Disc (DVD)), a magneto-optical disk (including a Mini Disk (MD) (a registered trademark)) and a semiconductor memory. Alternatively, the storage medium may be the ROM 1302 or a hard disc included in the storage part 1308, which stores the program and is distributed to the user, together with the device including the storage medium.

Obviously, various components and steps in the system and the method of the present disclosure may be separated and/or recombined. These separation and/or recombination should be considered as equivalents of the present disclosure. Moreover, the steps of the above series of processes may be, but are not necessarily, executed in a time order as described above. Some of the steps may be executed in parallel or separately to each other.

Although the embodiment of the present disclosure has been described in detail in combination with the drawings above, it should be understood that, the embodiment described above is only used to explain the invention and is not constructed as the limitation to the present disclosure. For those skilled in the art, various modification and alternation can be made to the above embodiment without departing from the essential and scope of the present disclosure. Therefore, the scope of the present disclosure is only defined by the appended claims and the equivalents thereof.

The present disclosure discloses the embodiments described above as well as the following appendix:

Appendix 1

An image processing device comprising:
an acquiring unit for acquiring an image containing an object image;
a calculating unit for calculating one or more candidate object image areas based on color and edge characteristics of the image;
a selecting unit for selecting, based a predetermined color model, a candidate object image area with the maximal similarity to the predetermined color model as a first object image area from the one or more candidate object image areas, wherein the maximal similarity is larger than or equal to a similarity threshold;
a determining unit for determining, based on color characteristics of the one or more candidate object image areas, other of the one or more candidate object image areas as a non-object image area or a second object image area with the first object image area;
a creating unit for creating, for each of the first and second object image areas, an adaptive color model; and
a detecting unit for detecting, based on the adaptive color model, an area containing the object image in the each of the first and second object image areas.

Appendix 2

The device according to Appendix 1, wherein the calculating unit comprises:
a page color calculating unit for calculating a page color based on the color of each pixel in the image;
a distance calculating unit for calculating a distance between the color of each pixel in the image and the page color to obtain a distance map;
a color image calculating unit for calculating a color binary image based on the distance map;
an edge image calculating unit for calculating an edge binary image based on the image;
a fusing unit for fusing the color binary image and the edge binary image to obtain a binary fused image; and
a connected component analyzing unit for performing connected component analysis algorithm on the binary fused image, so as to obtain one or more connected components in the binary fused image as the one or more candidate object image areas.

Appendix 3

The device according to Appendix 2, wherein the fusing unit comprises:
a classifying unit for classifying a pixel that is both a foreground pixel and a non-edge pixel as an object pixel, and a pixel that is either a background pixel or an edge pixel as a non-object pixel.

Appendix 4

The device according to Appendix 2, wherein the color image calculating unit comprises:
a classifying unit for classifying a pixel with a distance between the color value and the average color value larger than or equal to a distance threshold as a foreground pixel, and a pixel with a distance between the color value and the average color value small than the distance threshold as a non-object pixel, so as to obtain the color binary image.

Appendix 5

The device according to Appendix 2, wherein the edge image calculating unit comprises:
a gradient calculating unit for applying, based on the distance map or color information or intensity information of the image, a gradient operator to the image to obtain a gradient image; and
a classifying unit for classifying, in the gradient image, a pixel with a gradient larger than or equal to a gradient threshold as an edge pixel, and a pixel with a gradient smaller than the gradient threshold as a non-edge pixel, so as to obtain the edge binary image.

Appendix 6

The device according to Appendix 2, wherein the determining unit converts all pixels in a connected component with a distance to a predetermined edge of the image larger than a predetermined distance among the one or more connected components into non-object pixels, so that the connected component is no longer a candidate object image area.

Appendix 7

The device according to Appendix 2, wherein the calculating unit further comprises:
a counting unit for counting, for each row in the binary fused image, a sum of pixels which are object pixels;
a converting unit for converting all object pixels on a row for which the sum is smaller than a sum threshold into non-object pixels; and
an updating unit for updating labeling information of each connected component.

Appendix 8

The device according to Appendix 2, wherein the determining unit converts all pixels in a connected component with an area smaller than a lower limit area threshold or larger than an upper limit area threshold among the one or more connected components into non-object pixels, so that the connected component is no longer a candidate object image area.

Appendix 9

The device according to Appendix 1, wherein the determining unit comprises:
an average color calculating unit for calculating an average color value of pixels in the first object image area;
a distance calculating unit for calculating, in one of the other candidate object image areas, a distance between a color value of each pixel and the average color value;
a classifying unit for classifying a pixel with a distance between the color value and the average color value smaller than or equal to a distance threshold as an object pixel, and a pixel with a distance between the color value and the average color value larger than the distance threshold as a non-object pixel;

a ratio calculating unit for calculating a ratio of the number of object pixels to the number of pixels in the one of the other candidate object image areas; and an object image determining unit for determining the one of the other candidate object image areas with the ratio larger than or equal to a ratio threshold as a second object image area, and the one of the other candidate object image areas with the ratio smaller than the ratio threshold as a non-object image area.

Appendix 10

The device according to Appendix 1, further comprising:
an object image obtaining unit for obtaining, based on color characteristics of other area of the image except for the one or more candidate object image areas, a third object image area from the other area with the first object image area,
wherein the creating unit creates a further adaptive color model for the third object image area, and
the detecting unit detects an area containing the object image in the third object image area based on the further adaptive color model.

Appendix 11

The device according to Appendix 10, wherein the object image obtaining unit comprises:
an average color calculating unit for calculating an average color value of pixels in the first object image area;
a distance calculating unit for calculating, in the other area of the image except for the one or more candidate object image areas, a distance between a color value of each pixel and the average color value;
a classifying unit for classifying a pixel with a distance between the color value and the average color value smaller than or equal to a distance threshold as an object pixel, and a pixel with a distance between the color value and the average color value larger than the distance threshold as a non-object pixel, so as to obtain an other area binary image; and
a connected component analyzing unit for performing connected component analysis algorithm on the other area binary image, so as to obtain a connected component in the other area binary image as the third object image area.

Appendix 12

An image processing method, comprising:
acquiring an image containing an object image;
calculating one or more candidate object image areas based on color and edge characteristics of the image;
selecting, based a predetermined color model, a candidate object image area with the maximal similarity to the predetermined color model as a first object image area from the one or more candidate object image areas, wherein the maximal similarity is larger than or equal to a similarity threshold;
determining, based on color characteristics of the one or more candidate object image areas, other of the one or more candidate object image areas as a non-object image area or a second object image area with the first object image area;
creating, for each of the first and second object image areas, an adaptive color model; and
detecting, based on the adaptive color model, an area containing the object image in the each of the first and second object image areas.

Appendix 13

The method according to Appendix 12, wherein the step of calculating the one or more candidate object image areas based on the color and edge characteristics of the image comprises:
calculating a page color based on the color of each pixel in the image;
calculating a distance between the color of each pixel in the image and the page color to obtain a distance map;
calculating a color binary image based on the distance map;
calculating an edge binary image based on the image;
fusing the color binary image and the edge binary image to obtain a binary fused image; and
performing connected component analysis algorithm on the binary fused image, so as to obtain one or more connected components in the binary fused image as the one or more candidate object image areas.

Appendix 14

The method according to Appendix 13, wherein the step of calculating the one or more candidate object image areas based on the color and edge characteristics of the image further comprises:
counting, for each row in the binary fused image, a sum of pixels which are object pixels;
converting all object pixels on a row for which the sum is smaller than a sum threshold into non-object pixels; and
updating labeling information of each connected component.

Appendix 15

The method according to Appendix 13, wherein all pixels in a connected component with an area smaller than a lower limit area threshold or larger than an upper limit area threshold among the one or more connected components are converted into non-object pixels, so that the connected component is no longer a candidate object image area.

Appendix 16

The method according to Appendix 12, wherein the step of determining, based on color characteristics of the one or more candidate object image areas, other of the one or more candidate object image areas as a non-object image area or a second object image area with the first object image area comprises:
calculating an average color value of pixels in the first object image area; and
performing, in one of the other candidate object image areas, the following steps:
calculating a distance between a color value of each pixel and the average color value;
classifying a pixel with a distance between the color value and the average color value smaller than or equal to a distance threshold as an object pixel, and a pixel with a distance between the color value and the average color value larger than the distance threshold as a non-object pixel;
calculating a ratio of the number of object pixels to the number of pixels in the whole area; and
determining the one of the other candidate object image areas with the ratio larger than or equal to a ratio threshold as a second object image area, and the one of the other candidate object image areas with the ratio smaller than the ratio threshold as a non-object image area.

Appendix 17

The method according to Appendix 12, further comprising:
obtaining, based on color characteristics of other area of the image except for the one or more candidate object image areas, a third object image area from the other area with the first object image area,
creating a further adaptive color model for the third object image area, and
detecting an area containing the object image in the third object image area based on the further adaptive color model.

Appendix 18

The method according to Appendix 17, wherein the step of obtaining, based on color characteristics of other area of the image except for the one or more candidate object image areas, a third object image area from the other area with the first object image area comprises:
calculating an average color value of pixels in the first object image area;
in the other area of the image except for the one or more candidate object image areas,
calculating, a distance between a color value of each pixel and the average color value;
classifying a pixel with a distance between the color value and the average color value smaller than or equal to a distance threshold as an object pixel, and a pixel with a distance between the color value and the average color value larger than the distance threshold as a non-object pixel, so as to obtain an other area binary image; and
performing connected component analysis algorithm on the other area binary image, so as to obtain a connected component in the other area binary image as the third object image area.

Appendix 19

A program product, comprising machine-readable instruction codes stored therein, wherein the instruction codes, when read and executed by a computer, causes the computer executing the method according to any one of Appendixes 12 to 18.

Appendix 20

A machine-readable storage medium, carrying the program product according to Appendix 19 thereon.

The invention claimed is:

1. An image processing device, comprising:
an acquiring unit for acquiring an image containing an object image;
a calculating unit for calculating one or more candidate object image areas based on color and edge characteristics of the image;
a selecting unit for selecting, based on a predetermined color model, a candidate object image area with a maximal similarity to the predetermined color model as a first object image area from the one or more candidate object image areas, where the maximal similarity is larger than or equal to a similarity threshold;
a determining unit for determining, based on color characteristics of the one or more candidate object image areas, another of the one or more candidate object image areas as one of a non-object image area and a second object image area with the first object image area;
a creating unit for creating, for each of the first and second object image areas, an adaptive color model; and
a detecting unit for detecting, based on the respective adaptive color model, an area containing the object image in the each of the first and second object image areas.

2. The device according to claim 1, wherein the calculating unit comprises:
a page color calculating unit for calculating a page color based on a color of each pixel in the image;
a distance calculating unit for calculating a distance between the color of each pixel in the image and the page color to obtain a distance map;
a color image calculating unit for calculating a color binary image based on the distance map;
an edge image calculating unit for calculating an edge binary image based on the image;
a fusing unit for fusing the color binary image and the edge binary image to obtain a binary fused image; and
a connected component analyzing unit for performing a connected component analysis algorithm on the binary fused image, to obtain one or more connected components in the binary fused image as the one or more candidate object image areas.

3. The device according to claim 2, wherein the fusing unit comprises:
a classifying unit for classifying the pixel that is both a foreground pixel and a non-edge pixel as an object pixel, and classifying the pixel that is one of a background pixel and an edge pixel as a non-object pixel.

4. The device according to claim 2, wherein the color image calculating unit comprises:
a classifying unit for classifying the pixel with a distance between a color value and an average color value larger than or equal to a distance threshold as a foreground pixel, and classifying the pixel with a distance between the color value and the average color value smaller than the distance threshold as a non-object pixel, to obtain the color binary image.

5. The device according to claim 2, wherein the edge image calculating unit comprises:
a gradient calculating unit for applying, based on one of the distance map, color information and intensity information of the image, a gradient operator to the image to obtain a gradient image; and
a classifying unit for classifying, in the gradient image, the pixel with a gradient larger than or equal to a gradient threshold as an edge pixel, and classifying the pixel with a gradient smaller than the gradient threshold as a non-edge pixel, obtain the edge binary image.

6. The device according to claim 2, wherein the determining unit converts all pixels in a connected component with a distance to a predetermined edge of the image larger than a predetermined distance among the one or more connected components into non-object pixels, to make the connected component no longer a candidate object image area.

7. The device according to claim 2, wherein the calculating unit further comprises:
a counting unit for counting, for each row in the binary fused image, a sum of pixels which are object pixels;

a converting unit for converting all object pixels on a row for which the sum is smaller than a sum threshold into non-object pixels; and
an updating unit for updating labeling information of each connected component.

8. The device according to claim 2, wherein the determining unit converts all pixels in a connected component with an area smaller than one of a lower limit area threshold and larger than an upper limit area threshold among the one or more connected components into non-object pixels, to make the connected component no longer a candidate object image area.

9. The device according to claim 1, wherein the determining unit comprises:
an average color calculating unit for calculating an average color value of pixels in the first object image area;
a distance calculating unit for calculating, in one of other candidate object image areas, a distance between a color value of each pixel and the average color value;
a classifying unit for classifying the pixel with a distance between the color value and the average color value smaller than or equal to a distance threshold as an object pixel, and classifying the pixel with a distance between the color value and the average color value larger than the distance threshold as a non-object pixel;
a ratio calculating unit for calculating a ratio of a number of object pixels to a number of pixels in the one of the other candidate object image areas; and
an object image determining unit for determining a one of the other candidate object image areas with the ratio larger than or equal to a ratio threshold as a second object image area, and determining the one of the other candidate object image areas with the ratio smaller than the ratio threshold as a non-object image area.

10. The device according to claim 1, further comprising:
an object image obtaining unit for obtaining, based on color characteristics of other areas of the image except for the one or more candidate object image areas, a third object image area from the other areas with the first object image area,
wherein the creating unit creates a further adaptive color model for the third object image area, and
the detecting unit detects an area containing the object image in the third object image area based on the further adaptive color model.

11. The device according to claim 10, wherein the object image obtaining unit comprises:
an average color calculating unit for calculating an average color value of pixels in the first object image area;
a distance calculating unit for calculating, in other areas of the image except for the one or more candidate object image areas, a distance between a color value of each pixel and the average color value;
a classifying unit for classifying the pixel with a distance between the color value and the average color value smaller than or equal to a distance threshold as an object pixel, and classifying the pixel with a distance between the color value and the average color value larger than the distance threshold as a non-object pixel, to obtain an other area binary image; and
a connected component analyzing unit for performing a connected component analysis algorithm on the other area binary image, to obtain a connected component in the other area binary image as the third object image area.

12. An image processing method, comprising:
acquiring an image containing an object image;
calculating one or more candidate object image areas based on color and edge characteristics of the image;
selecting, based a predetermined color model, a candidate object image area with a maximal similarity to the predetermined color model as a first object image area from the one or more candidate object image areas, wherein the maximal similarity is larger than or equal to a similarity threshold;
determining, based on color characteristics of the one or more candidate object image areas, another of the one or more candidate object image areas as one of a non-object image area and a second object image area with the first object image area;
creating, for each of the first and second object image areas, an adaptive color model; and
detecting, based on the respective adaptive color model, an area containing the object image in the each of the first and second object image areas.

13. The method according to claim 12, wherein the calculating the one or more candidate object image areas based on the color and edge characteristics of the image comprises:
calculating a page color based on the color of each pixel in the image;
calculating a distance between the color of each pixel in the image and the page color to obtain a distance map;
calculating a color binary image based on the distance map;
calculating an edge binary image based on the image;
fusing the color binary image and the edge binary image to obtain a binary fused image; and
performing a connected component analysis algorithm on the binary fused image, to obtain one or more connected components in the binary fused image as the one or more candidate object image areas.

14. The method according to claim 13, wherein the calculating the one or more candidate object image areas based on the color and edge characteristics of the image further comprises:
counting, for each row in the binary fused image, a sum of pixels which are object pixels;
converting all object pixels on a row for which the sum is smaller than a sum threshold into non-object pixels; and
updating labeling information of each connected component.

15. The method according to claim 13, wherein all pixels in a connected component with one of an area smaller than a lower limit area threshold and larger than an upper limit area threshold among the one or more connected components are converted into non-object pixels, to make the connected component no longer a candidate object image area.

16. The method according to claim 12, wherein the determining, based on color characteristics of the one or more candidate object image areas, other of the one or more candidate object image areas as a non-object image area or a second object image area with the first object image area comprises:
calculating an average color value of pixels in the first object image area; and
performing, in one of the other candidate object image areas, the following steps:
calculating a distance between a color value of each pixel and the average color value;

classifying the pixel with a distance between the color value and the average color value smaller than or equal to a distance threshold as an object pixel, and classifying the pixel with a distance between the color value and the average color value larger than the distance threshold as a non-object pixel;

calculating a ratio of a number of object pixels to a number of pixels in a whole area; and determining the one of the other candidate object image areas with the ratio larger than or equal to a ratio threshold as a second object image area, and determining the one of the other candidate object image areas with the ratio smaller than the ratio threshold as a non-object image area.

17. The method according to claim 12, further comprising:

obtaining, based on color characteristics of another area of the image except for the one or more candidate object image areas, a third object image area from the another area with the first object image area, creating a further adaptive color model for the third object image area, and detecting an area containing the object image in the third object image area based on the further adaptive color model.

18. The method according to claim 17, wherein the obtaining, based on color characteristics of other area of the image except for the one or more candidate object image areas, a third object image area from the other area with the first object image area comprises:

calculating an average color value of pixels in the first object image area;

in the another area of the image except for the one or more candidate object image areas, calculating, a distance between a color value of each pixel and the average color value;

classifying the pixel with a distance between the color value and the average color value smaller than or equal to a distance threshold as an object pixel, and classifying the pixel with a distance between the color value and the average color value larger than the distance threshold as a non-object pixel, to obtain an other area binary image; and performing connected component analysis algorithm on the other area binary image, to obtain a connected component in the other area binary image as the third object image area.

19. A non-transitory machine-readable storage medium carrying a program product comprising machine-readable instruction codes stored therein, wherein the instruction codes, when read and executed by a computer, cause the computer to execute the method according to claim 12.

* * * * *